United States Patent [19]

MacDonald

[11] Patent Number: 5,343,608

[45] Date of Patent: Sep. 6, 1994

[54] METHOD OF FORMING AN IDENTIFICATION BAND

[76] Inventor: Robert D. MacDonald, 8012 E. Via Campo, Scottsdale, Ariz. 85258

[21] Appl. No.: 98,575

[22] Filed: Jul. 28, 1993

Related U.S. Application Data

[62] Division of Ser. No. 872,291, Apr. 22, 1992, abandoned.

[51] Int. Cl.$^5$ .............................................. B23P 11/02
[52] U.S. Cl. ........................................ 29/450; 29/417;
40/633; 63/3; 63/DIG. 3; 283/75; 283/900
[58] Field of Search .................. 29/412, 417, 450, 451,
29/DIG. 40, 33 T, 282; 40/660, 661, 633, 665;
63/1.1, 2, 3, DIG. 3; 224/119, 202; 283/75, 900;
83/23, 24, 25

[56] References Cited

U.S. PATENT DOCUMENTS

| | | | |
|---|---|---|---|
| 839,047 | 12/1906 | Sylvester | 63/3 X |
| 1,371,925 | 3/1921 | Morgenthaler | 40/633 |
| 2,449,181 | 9/1948 | Smiley | 63/3 X |
| 2,738,616 | 3/1956 | Windle | 63/DIG. 3 X |
| 2,893,143 | 7/1959 | Mosher, Jr. et al. | 40/633 |
| 2,954,620 | 10/1960 | Schneider | 40/633 |
| 3,197,899 | 8/1965 | Twentier | 40/633 |
| 3,552,119 | 1/1971 | Newman et al. | 63/3 X |
| 3,698,383 | 10/1972 | Baucom | 40/660 X |
| 3,800,450 | 4/1974 | Laugherty et al. | 40/633 |
| 3,822,621 | 7/1974 | Knights et al. | 83/23 |
| 4,121,360 | 10/1978 | Vlerebome | 40/639 X |
| 4,121,574 | 10/1978 | Lester | 283/75 X |
| 4,311,740 | 1/1982 | Kay | 283/75 X |
| 4,476,381 | 10/1984 | Rubin | 283/900 X |
| 4,753,086 | 6/1988 | Schmidt | 63/DIG. 3 X |
| 4,768,688 | 9/1988 | Harrigan | 63/3 X |

FOREIGN PATENT DOCUMENTS 1000098  2/1952  France .
1033976  7/1953  France .

*Primary Examiner*—Peter Dungba Vo
*Attorney, Agent, or Firm*—Dykema Gossett

[57] ABSTRACT

A method of forming an identification band from a tube with a constant circular cross-section along the majority of its outer circumference. The tube holds an indicia, and the information on the indicia is magnified by the generally circular shape of the tube. The circular shape also minimizes contact between the band and the wearer. Contact is limited to line contact with the skin, and irritation of the skin is reduced by eliminating any edges which may cut or scrape the skin. A method of forming the identification band includes the steps cutting a predetermined length of tube, placing an indicia therein, and completing the assembly by inserting an untapered cylindrical plug into each end of the tube.

3 Claims, 1 Drawing Sheet

METHOD OF FORMING AN IDENTIFICATION BAND

This application comprises a division of copending U.S. application Ser. No. 07/872,291, filed on Apr. 22, 1992 now abandoned.

BACKGROUND OF THE INVENTION

This invention relates to improved identification bands.

Identification bands have a variety of functions. The most common use of identification bands is in hospitals to identify and provide information on a patient. In hospitals in particular, the patient may often wear the band over an extended period of time. Prior art identification bands are generally flat, increasing contact with the skin. Flat identification bands also include edges which may cut or scrap the skin adjacent to the band. Over an extended period of time, these bands can cause irritation to the skin. It would be a great advantage to reduce the contact area by even a small amount, and to eliminate any edges.

One known prior art identification band had a circular cross-section over a portion of its circumference. A generally planar flex section connects two separate tubular cross-section portions. This structure is an improvement over the basic prior art, however, the flex section still results in undesirable amounts of contact, and sharp edges. Further, this prior art device had an integral connecting plug on one of its tubular portions which is received within the other tubular portion. This structure would be undesirably expensive to manufacture.

Such bands may also be used on children during field trips, on people in nursing homes, and even on pets. Many prior art identification bands include complicated structures which make them expensive to manufacture, and difficult to use. Since these bands are used in large numbers, it would be desirable to reduce the costs of the band, and simplify their use.

SUMMARY OF THE INVENTION

The present invention discloses an identification band which greatly reduces contact with the person wearing the band. The band has a circular shape about its entire circumference such that any contact with the person is limited to line contact. This minimum contact with the patient reduces the likelihood of irritation. For identification purposes, the hollow band receives an indicia which is magnified when the information is read through the circular band. The band is simple in construction and formed by inserting a cylindrical connection plug into each end of a tube.

A method disclosed by the present invention includes the steps of cutting a predetermined length of flexible, transparent tubing, and inserting an indicia into a hollow portion of the tube. The connection plug is then inserted into one end of the tubular member. The band is then positioned around the wearer, and the remaining end of the tubular member is inserted on the opposing end of the connecting plug. The connecting plug, which has a smooth outer surface along its cylindrical shape, has surprising retention capability. Solvent may also be applied to the connecting plug to render the connection even more secure.

These and other features of the present invention can be best understood from the following specification and drawings, of which the following is a brief description.

DETAILED DESCRIPTION OF A PREFERRED EMBODIMENT

Figure 1:
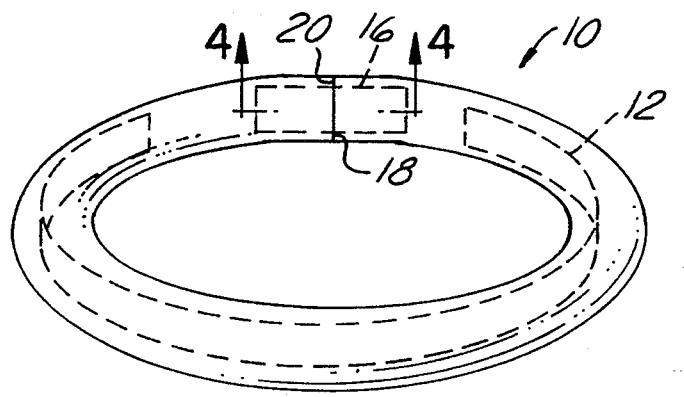
FIG. 1 is a perspective view of an assembled identification band according to the present invention.

FIG. 1 illustrates identification band 10 which includes an indicia 12 that contains pertinent information on a wearer. Identification band 10 includes a flexible, transparent tubular member 14 with a hollow interior. The flexible tubular member 14 is formed into a ring by securing ends with a connection plug 16 which has a generally untapered cylindrical shape.

Tubular member 14 has a constant circular cross-section throughout the entire circumference of the band 10. The connection between connection plug 16 and tubular member 14 is water proof such that indicia 12 is protected.

Figure 2B:
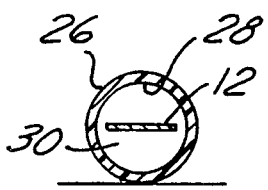
FIG. 2B is a sectional view along line 2B—2B of FIG. 2A.
Figure 2A:
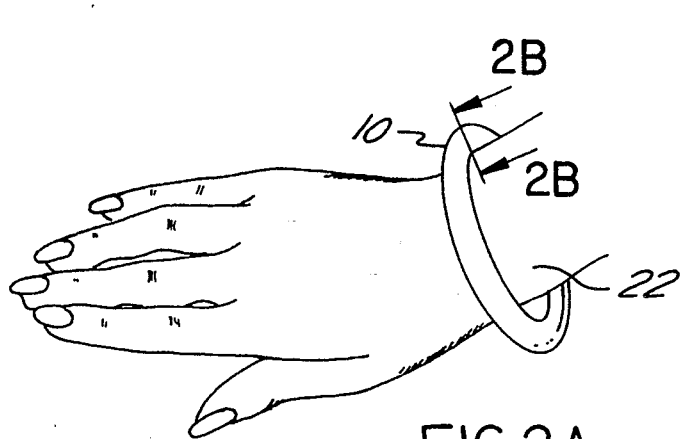
FIG. 2A is a perspective view of an identification band on a wearer.

As illustrated in FIG. 2A, identification band 10 may be worn on a wrist 22. The identification band 10 is flexible, yet rigid enough to hold its ring-like shape.

As illustrated in FIG. 2B, due to the circular cross-section, the portion of the identification band 10 which contacts the skin is limited to a line contact 24. This line contact 24 is the only contact maintained throughout the circumference of identification band 10.

The tubular member 14 has a radially outer wall 26 and a radially inner wall 28. The inner wall 28 defines a clear chamber 30 which houses the indicia 12. Due to the absence of a flat surface at any portion of the identification band 10, there exists no edge portion which might potentially scrape or cut the skin of the wearer.

As also shown in FIG. 2A, due to the ring shape of identification band 10, a great deal of the inner circumference identification band 10 does not contact wrist 22.

Figure 3:
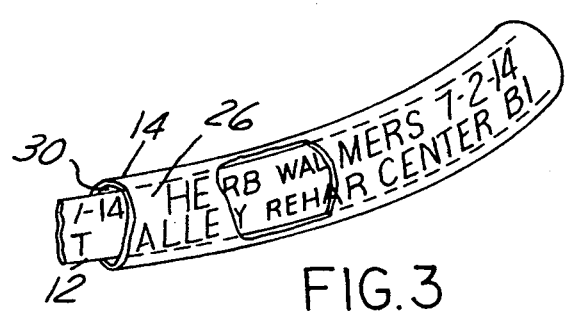
FIG. 3 is a fragmentary perspective view illustrating a feature of the present invention.

As illustrated in FIG. 3, the indicia 12 is magnified when read through the curved outer wall 26 of tubular member 14. The curved outer wall 26 enlarges the lettering on the indicia 12 within clear chamber 30 to make the information more easily readable.

Figure 4:
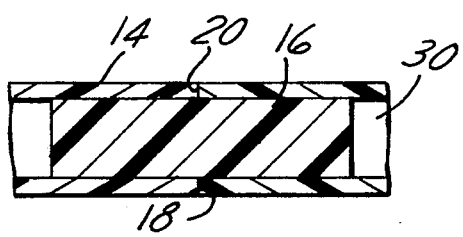
FIG. 4 is a sectional view along line 4—4 of FIG. 1.

FIG. 4 illustrates connecting plug 16 inserted into ends 18 and 20 of the tubular member 14. The connecting plug 16 has a cylindrical, generally untapered shape and a smooth surface. Essentially, it may be a simple plastic rod. The connecting plug 16 is preferably solid, and more rigid than the flexible tubular member The diameter of the connecting plug 16 is approximately equal to the inner diameter of inner walls 28 of tubular member 14.

The cylindrical connection plug 16 provides surprising retention capabilities. With this design, the ends 18 and 20 of the tubular member 14 are easily inserted over the connecting plug 16, yet surprisingly difficult to pull away from the connecting plug 16.

Although other plastics may be used, the tubular member 14 is preferably made from flexible PVC, while the connecting plug 16 preferably made from a rigid PVC. This combination of material provides for a high coefficient of friction between the connection plug 16 and the tubular member 14. Although the connection is quite secure, the application of a few drops of PVC solvent where the connecting plug 16 meets the tubular member 14 may be used to render the connection even more secure.

Figure 5:
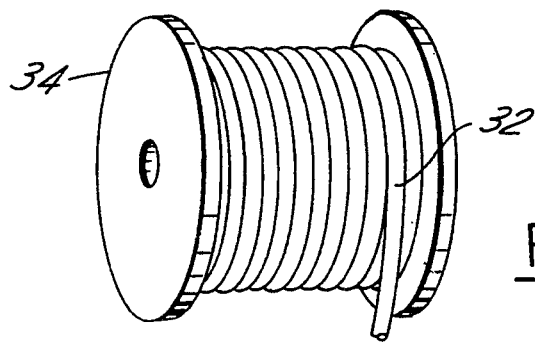
FIG. 5 illustrates a tube roll used to form a portion of the present invention.

As illustrated in FIG. 5, the tubular member 14 is formed from clear, flexible tubing 32 stored on a roll 34. The tubular member 4 is cut to a predetermined size from roll 34 to fit the wearer. The indicia 12 is then inserted into the hollow interior of the tubular member 14, and the connecting plug 16 is inserted into one of the ends 8 and 20 of the tubular member 14. The tubular member 14 is then placed around the wearer, and the other end of the connecting plug 16 is inserted into the remaining end 18 and 20 of the tubular member 14, forming the identification band 10.

Since connecting plug 16 is cylindrical, it can be cut from plastic rod stock. The use of roll 34 and the connecting plug 16 thus allows commonly used material to form the identification band 10. This reduces the cost of identification band 10.

A preferred embodiment of the present invention has been disclosed. A worker of ordinary skill in the art, however, would realize that certain modifications of this invention would come with the teachings of this application. Thus, the following claims should be studied in order to determine the true scope and content of the invention.

What I claim is:

1. A method of forming an identification band comprising the steps of:

measuring a predetermined length of a transparent flexible tube having a generally constant circular cross-section with a hollow interior and an outer periphery with a pre-determined curvature;

cutting said tube to correspond to said predetermined length and creating an identification band body with first and second free ends;

placing a planar indicia member in said hollow interior of said band body between said first and second free ends, said indicia member having a substantially planar surface including a plurality of alphanumeric characters thereon, said substantially planar surface being free from contact with an interior surface of said hollow interior, thereby magnifying said plurality of alphanumeric characters by said pre-determined curvature of said outer periphery of said band body and producing a pre-determined magnified image because of a relative position of said planar indicia member in said band body;

providing a connection plug with first and second ends, said first and second ends adapted to engage said interior surface of said hollow interior of said band body;

inserting said first end of said connection plug into said first free end of said band body;

inserting said second end of said connection plug into said second free end of said band body; and securing said first and second free ends of said band body to said connection plug, thereby forming a generally circular identification band, and retaining said indicia member in said relative position in said band body of said identification band.

2. The method of forming an identification band as recited in claim 1, further comprising the step of adding a securing means between said first and second free ends of said band body and said first and second ends of said connection plug to prevent disengagement of said connection plug from said first and second free ends of said band body.

3. The method of forming an identification band as recited in claim 2, wherein said securing means is a solvent.

* * * * *